Patented July 19, 1949

2,476,846

UNITED STATES PATENT OFFICE 2,476,846

RECLAMATION OF WASTE OIL BASE DRILLING FLUID

Reginald D. Dawson, Berkeley, Calif., assignor to Shell Development Company, San Francisco, Calif., a corporation of Delaware No Drawing. Application November 2, 1946, Serial No. 707,521

5 Claims. (Cl. 252—8.5)

This invention pertains to oil base drilling fluids such as employed in the drilling of wells by the rotary method, and relates more particularly to an improved method whereby waste drilling fluids of the oil base type are separated into their component parts which are reclaimed for re-use.

Drilling fluids or muds are generally used when drilling wells by the rotary method. These muds are usually pumped down through the drill stem of the rotary rig and around the drill bit, returning to the surface through the annular passage between the drill stem and the well casing. Drilling fluids, circulated in this manner during the operation of drilling, fulfill the various functions of carrying cuttings to the surface of the well, cooling and lubricating the drilling tools, sealing the walls of the borehole, preventing the settling of the cuttings around the drill bit, and supplying a static head to overcome pressures encountered during the drilling operations that tend to blow the fluid from the borehole.

Drilling fluids used are either of the aqueous or non-aqueous type. The non-aqueous or oil-base type may have, as a suspending component or medium, a suitable liquid such as Diesel oil, fuel oil, crude oil, kerosene, gas oil, a coal tar or petroleum distillate, stove oil, naphtha and the like. A typical oil base drilling mud as treated by the method of the present invention may comprise Diesel oil as the suspending medium, a finely divided solid material such as crushed oyster shells, barites, magnetite, etc., as the suspended medium, a plastering agent such as blown asphalt and a stabilizing agent such as lampblack. Such muds are disclosed in U. S. Patents Nos. 2,222,949 and 2,223,027. These drilling muds may comprise from 1 to 10% of lamp black, from about 5 to 15% of blown asphaltic bitumens and 30 to 60% of a finely-divided solid or weighting material, said compounds being suspended in an oil.

During drilling operations the drilling fluid may become contaminated with formation water and suspended cuttings such as sand, shale or clay. Any such contamination in time tends to alter the weight, viscosity and suspending and sheathing properties of the drilling mud so that it eventually has to be either reclaimed or discarded and replaced.

Since it is economically not desirable to discard large quantities of relatively costly drilling fluids, it is an object of this invention to provide a practical and inexpensive method for reclaiming waste oil-base drilling muds of this type.

Another object of this invention is to provide a method of treating spent oil base drilling muds so that the suspending oil base component is separated from both the added materials and the contaminating matter.

A still further object is to provide a method of treating contaminated oil-base drilling muds so as to separate contaminating liquids and solids from the muds for the purpose of reclaiming and reusing the original components of the drilling muds.

It has been found that the addition of a soluble alkali metal salt such as sodium silicate to waste oil base muds will effect a separation of the components into definite layers when mud-silicate mixture is allowed to settle or is centrifuged. It is understood that other soluble alkali salts, preferably alkali metal silicates, may be used to effect the layer separation of waste oil base muds. The term alkali silicates refers to salts of alkali metals and of ammonium. The amount of sodium silicate used may vary over a wide range, from a minimum of 2% sodium silicate by weight on the total weight of the mud treated, to a quantity of silicate sufficient to substantially saturate the water in the waste mud, best results being obtained when using about 5% sodium silicate by weight on the total weight of the mud treated. A preferred manner of operating is carried out at 70 to 80° C., agitating the mixture before settling.

In the operation of this method a waste oil base mud contaminated with water and clay is heated to 70–80° C. and agitated with a concentrated solution of a soluble alkali metal salt such as sodium silicate. This mixture is then poured gently onto warm water or preferably onto an aqueous solution of soluble alkali metal salt such as sodium nitrate, the latter compound being used to raise the specific gravity of the aqueous layer to a value higher than that of the waste mud in order to prevent mixing. Instead of sodium nitrate, other salts capable of raising the specific gravity of an aqueous phase may equally well be used, for example: potassium nitrate, sodium nitrite and ammonium nitrate. Upon settling the mineral matter leaves the oil layer, the mixture settling into three distinct layers. The top oily layer consists of all the oil and blown asphalt, and 85–95% of the lampblack. When used in mixing fresh oil-base mud, material formed from this layer yields a very satisfactory oil-base mud of good gel strength and excellent plastering properties. A middle or intermediate layer will contain most of the water and clay and is discarded. The heavy bottom layer consists of sand, some clay, and the mineral matter used in making up the original oil base mud (oyster shells, barite, magnetite or other weighting material). This weighting material is valuable and may be recovered by separating it from the sand and clay by any of the numerous processes at present in use for the recovery of weighting materials from waste water base muds.

It may be seen from the above description that this method of reclaiming waste oil-base muds is simple and economical as shown by the fact that at least 85% of all the components of the original mud are recovered in usable form and the cost of the treating chemicals, when using the preferred sodium silicate to effect a satisfactory separation, is only 5% of the cost of new or fresh oil-base mud.

An alternative method for the reclamation of oil-base mud is to agitate the mud with about 5% sodium silicate by weight on the total weight of mud treated. This mixture is then heated to 80° C. and centrifuged. Three distinct layers are quickly formed; the oil, asphalt and lampblack being recoverable from the top layer and the weighting materials from the bottom layer.

The separation of waste oil-base drilling muds may be effected in several ways as illustrated by the following examples:

Example I

A waste oil-base mud contaminated with water and clay was heated to 70–80° C. and agitated with sufficient solid powdered sodium metasilicate to saturate the water in the waste mud. The mixture was then gently poured on to an aqueous solution of sodium nitrate and allowed to settle.

Three distinct layers settled out. The top oily layer contained all the oil and asphalt and at least 90% of the lampblack. The intermediate layer was water while the heavy bottom layer consisted of clay, sand, about 8% of the lampblack and the weighting materials (oyster shells, barite, etc.) that were used in the original mud.

Example II

A waste oil-base mud contaminated with water and clay was heated to 70–80° C. and agitated with a solution containing 5% silicate by weight on the total weight of mud treated. The mixture was gently poured onto an aqueous solution of sodium nitrate and allowed to settle.

The results upon settling were the same as obtained in Example I.

Example III

A waste oil-base mud contaminated with water and clay was heated to 80° C. and treated with a solution containing 2% silicate by weight on the total weight of the mud treated. The mixture was centrifuged for 20 minutes at 1500 R. P. M.

The mixture separated into three sharp layers, the top layer containing all the asphalt and lampblack, 85–100% of the oil, 2–4% water and 3–5% mineral matter. The middle layer was clear water while the bottom layer consisted of some water, up to 15% of the oil and most of the mineral matter (clay, sand and weighting materials such as oyster shells, barite, etc.).

I claim as my invention:

1. A method for separating the contaminating foreign matter admixed during drilling to an oil-base drilling fluid comprising a suspending hydrocarbon oil, a finely divided solid material suspended therein, a stabilizing agent and a plastering agent, said agents being carbon-containing compounds, the steps of mixing the contaminated drilling fluid with an aqueous solution of an alkali silicate at a temperature of at least 70° C., subjecting said mixture to agitation, pouring said mixture while minimizing agitation onto a substantially concentrated aqueous solution of a neutral salt other than an alkali silicate, having a specific gravity greater than said mixture, settling said mixture to form three layers in said solution, the top layer comprising the suspending hydrocarbon oil and substantially all of the carbon-containing stabilizing and plastering agents, and the bottom layer comprising the suspended solid material, and separately removing said three layers.

2. A method for separating the contaminating foreign matter admixed during drilling to an oil-base drilling fluid comprising a suspending hydrocarbon oil, a finely divided solid material suspended therein, a stabilizing agent and a plastering agent, said agents being carbon containing compounds, the steps of mixing the contaminated drilling fluid with an aqueous solution of an alkali silicate at a temperature of at least 70° C., subjecting said mixture to agitation, pouring said mixture while minimizing agitation onto a substantially concentrated aqueous solution of a neutral salt other than an alkali silicate having a specific gravity greater than said mixture, settling said mixture to form three layers in said solution, the top layer comprising the suspending hydrocarbon oil and substantially all of the carbon containing stabilizing and plastering agents, and the bottom layer comprising the suspended solid material, and separately removing said three layers.

3. A method for separating the contaminating foreign matter admixed during drilling to an oil-base drilling fluid comprising a suspending hydrocarbon oil, a finely divided solid material suspended therein, a stabilizing agent consisting of lampblack and a plastering agent consisting of blown asphalt, the steps of mixing the contaminated drilling fluid with an aqueous solution of an alkali silicate at a temperature of at least 70° C., subjecting said mixture to agitation, pouring said mixture while minimizing agitation onto a substantially concentrated aqueous solution of a neutral salt other than an alkali silicate having a specific gravity greater than said mixture, settling said mixture to form three layers in said solution, the top layer comprising the suspending hydrocarbon oil and substantially all of the carbon containing stabilizing and plastering agents, and the bottom layer comprising the suspended solid material, and separately removing said three layers.

4. A method for separating the contaminating foreign matter admixed during drilling to an oil-base drilling fluid comprising a suspending hydrocarbon oil, 30 to 60% of a finely divided solid material suspended therein, 1 to 10% of lampblack and 5 to 15% of blown asphalt, said agents being carbon-containing compounds, the method comprising the steps of mixing the contaminated drilling fluid with an aqueous solution of an alkali silicate at a temperature of at least 70° C., pouring said mixture while minimizing agitation onto a substantially concentrated aqueous solution of a neutral salt other than an alkali silicate having a specific gravity greater than said mixture, settling said mixture to form three layers in said solution, the top layer comprising the suspending hydrocarbon oil and substantially all of the carbon-containing stabilizing and plastering agents, and the bottom layer comprising the suspended solid material, and separately removing said three layers.

5. A method for separating the contaminating foreign matter admixed during drilling to an oil-base drilling fluid comprising a suspending hydrocarbon oil, 30 to 60% of a finely divided solid material suspended therein, 1 to 10% of lampblack and 5 to 15% of blown asphalt, said agents being carbon-containing compounds, the method comprising the steps of mixing the contaminated drilling fluid with an aqueous solution of an alkali silicate at a temperature of at least 70° C., pouring said mixture while minimizing agitation onto a substantially concentrated aqueous solution of sodium nitrate having a specific gravity greater than said mixture, settling said mixture to form three layers in said solution, the top layer comprising the suspending hydrocarbon oil and substantially all of the carbon-containing stabilizing and plastering agents, and the bottom layer comprising the suspended solid material, and separately removing said three layers.

REGINALD D. DAWSON.

REFERENCES CITED

The following references are of record in the file of this patent:

UNITED STATES PATENTS

| Number | Name | Date |
|---|---|---|
| 1,647,310 | Richardson | Nov. 1, 1927 |
| 1,703,647 | Van Brunt | Feb. 26, 1929 |
| 1,800,168 | Brauer et al. | Apr. 7, 1931 |
| 1,926,188 | Ambler | Sept. 12, 1933 |
| 1,936,901 | Evans | Nov. 28, 1933 |
| 2,030,577 | Evans | Feb. 11, 1936 |
| 2,124,814 | De Stagni | July 26, 1938 |